Feb. 13, 1940. L. E. JARRETT Re. 21,349
ADJUSTABLE ROLLER BRACE FOR SHAKER CONVEYERS
Original Filed June 29, 1937
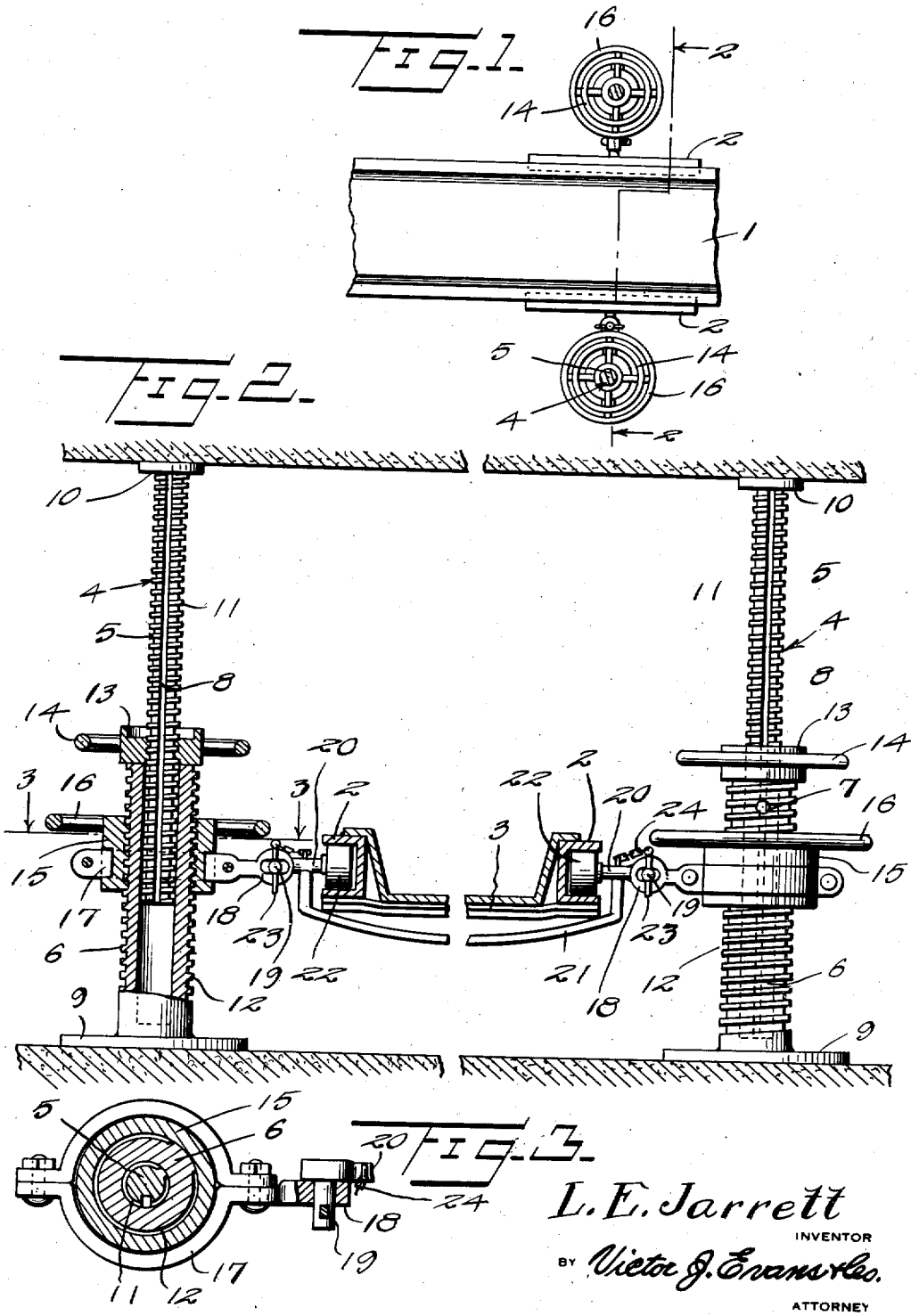
L. E. Jarrett
INVENTOR
BY Victor J. Evans & Co.
ATTORNEY Reissued Feb. 13, 1940

Re. 21,349

UNITED STATES PATENT OFFICE 21,349

ADJUSTABLE ROLLER BRACE FOR SHAKER CONVEYERS

Luther E. Jarrett, Montgomery, W. Va., assignor to Goodman Manufacturing Company, Chicago, Ill., a corporation of Illinois Original No. 2,141,439, dated December 27, 1938, Serial No. 151,023, June 29, 1937. Application for reissue September 2, 1939, Serial No. 293,305

6 Claims. (Cl. 198—220)

This invention relates to braces or supports for shaker conveyers and has for its primary object the provision of a device of this character which may be readily set up and adjusted to a ceiling and flooring of a mine and which will efficiently maintain a conveyer in proper position and permit raising and lowering of said conveyer and the leveling thereof where the mine floor is uneven.

With these and other objects in view, this invention consists in certain novel features of construction, combination and arrangement of parts to be hereinafter more fully described and claimed.

For a complete understanding of my invention, reference is to be had to the following description and accompanying drawing, in which:

Figure 1 is a top plan view illustrating a brace constructed in accordance with the present invention and having associated therewith a shaker conveyer.

Figure 2 is a sectional view taken on the line 2—2 of Figure 1.

Figure 3 is a sectional view taken on the line 3—3 of Figure 2.

Referring in detail to the drawing, the numeral 1 indicates a fragmentary portion of a shaker conveyer trough section having secured to opposite sides thereof channeled members 2, which members are connected together by a brace 3, secured to and extending beneath said trough section.

Arranged at opposite sides of the conveyer 1 are vertically arranged supporting members or jacks 4 adapted to be interposed and secured between a mine roof and bottom in a usual manner. Each of said jacks is constructed of telescopic sections 5 and 6. The section 5 is free to slide within the section 6 but is held against rotation relative to the section 6 by a pin 7 fitting in a groove 8 thereof. A base 9 is formed on the section 6 and a head 10 is formed on the section 5. The base 9 is adapted to rest on the flooring of a mine while the head 10 is adapted to be adjusted into engagement with the ceiling of a mine. Feed threads 11 and 12 are formed on the sections 5 and 6. Journaled on the upper end of the section 6, and meshing with the feed threads 11, is a feed nut 13 having a hand wheel 14. By rotating the hand wheel 14 in opposite directions, the section 5 can be adjusted inwardly and outwardly of the section 6. A feed nut 15 meshes with the feed threads 12 of the section 6 and is provided with a hand wheel 16.

The feed nuts 15 have grooves to receive split clamps 17 which form supporting collars for stub shafts 20. The feed nuts 15 are free to rotate in the clamps 17 and formed on the latter are apertured extensions 18 to receive pivot pins 19. The pivot pins 19 are carried by said stub shafts and said stub shafts are connected together by a brace 21 extending under the conveyer. The stub shafts have journaled thereon rollers 22 which engage in the channeled members 2. The pivot pins 19 have heads and slots, the latter receiving removable pins 23 secured to the stub shafts by flexible elements 24.

The brace 21 thus rigidly connects the rollers 22, 22 and stub shafts 20, 20 in oppositely disposed pairs and since said stub shafts are pivotally connected to the clamps 17, 17, independent vertical adjustment of said clamps may adjust the trough 1 to the desired position with respect to the ground or rest of the trough line, and permit the trough line to readily conform to an uneven mine bottom. Likewise the trough section may be vertically adjusted and held in such adjustment when the jacks 4 are disposed at various angular relationships with respect to each other.

A device of the character described may be readily set up within an entry or working place of a mine by adjusting the sections 5 and 6 relative to each other to bring the bases and heads in engagement with the floor and ceiling of the mine. This adjustment is easily accomplished by the rotation of the hand wheels 14. The supporting members 4, thus arranged, effectively support the conveyer, the latter capable of having relative movement thereto by the rollers 22, engaging the channeled members, and said rollers besides serving as a support for the trough, likewise tend to hold the trough from lifting movement and also hold it in horizontal alignment with the rest of the conveyer, serving as a guide frame therefor. Further, the conveyer may be leveled by adjusting the feed nuts 15 on the section 6 either in an upward or downward direction. The stub shafts 20 may be readily detached from the feed nuts 15 when it is desired to remove the conveyer from the support and move the support to another place in the mine.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

Having described the invention, I claim:

1. In a shaker conveyer trough support, a pair of spaced apart supporting jacks adapted to be interposed between a mine roof and floor, a conveyer trough, a support for said trough between said jacks for supporting said trough for reciprocable movement with respect thereto including a pair of oppositely disposed rollers, supporting and guide members extending along opposite sides of said conveyer trough adapted to engage said rollers, and a supporting connection between said rollers and jacks including support members mounted on said jacks for vertical adjustment with respect thereto, a pair of oppositely disposed stub shafts having said rollers journaled thereon, and pivotal connections between said stub shafts and support members, permitting said stub shafts to be horizontally positioned, when said jacks are in various angular positions with respect to each other and permitting said shafts and rollers to be adjusted to level said trough in a transverse direction and permit said trough to be aligned with the remainder of the conveyer trough line in a longitudinal direction.

2. In a shaker conveyer trough support, a pair of spaced apart supporting jacks adapted to be interposed between a mine roof and floor, a pair of spaced apart shafts having rollers thereon adapted to form a slidable support for a trough of a shaker conveyer trough line, a member extending beneath said trough, for rigidly connecting said shafts together, support members mounted on said jacks for vertical adjustable movement therealong, and pivotal connections between said support members and shafts to permit independent vertical adjustment of said shafts and to permit a plurality of sets of said supporting jacks and rollers to be readily adjusted to support a shaker conveyer trough line in aligned relationship in both horizontal and vertical planes and level in a transverse direction where the floor is uneven and said jacks are secured between the mine roof and floor in various angular positions with respect to each other.

3. In a shaker conveyer trough support, a pair of spaced apart supporting jacks adapted to be interposed between a mine roof and floor, a pair of spaced apart shafts having rollers thereon adapted to form a support for a trough of a shaker conveyer trough line, support members mounted on said jacks for vertical adjustable movement therealong, pivotal connections between said support members and shafts to permit said shafts and rollers to be horizontally positioned when said jacks extend in various angular positions with respect to the ground, and self-contained means for independently vertically adjusting said support members along said jacks, to level said trough in a transverse direction and align said trough with the rest of the trough line in a longitudinal direction.

4. In a shaker conveyer trough support, a pair of spaced apart supporting jacks adapted to be interposed and secured between a mine roof and floor, a conveyer trough adapted to be supported to reciprocate between said jacks, supporting and guide members extending along opposite sides of said conveyer trough, rollers engaging said guide members for supporting said trough, a pair of oppositely disposed stub shafts upon which said rollers are journaled, means for rigidly connecting said stub shafts in oppositely disposed pairs, support members mounted on said jacks for vertical adjustment therealong, and pivotal connections between said stub shafts and support members, permitting independent adjustment of said stub shafts along said jacks, when said jacks are in various angular positions with respect to each other, and permitting said shafts and rollers to be readily adjusted to support said trough in a level position in a transverse direction and in aligned relationship with the rest of the conveyer.

5. In a shaker conveyer trough support, a pair of spaced apart supporting jacks adapted to be interposed between a mine roof and floor, a conveyer trough adapted to be supported to reciprocate between said jacks, supporting and guide members extending along opposite sides of said conveyer trough, rollers engaging said guide members for supporting said trough, a pair of oppositely disposed stub shafts upon which said rollers are journaled, means for rigidly connecting said stub shafts in oppositely disposed pairs, support members mounted on said jacks for vertical adjustment with respect thereto, pivotal connections between said stub shafts and support members permitting independent adjustment of said stub shafts along said jacks, when said jacks are in various angular positions with respect to each other, and self-contained means for vertically moving said support members along said jacks to permit ready adjustment of said stub shafts along said jacks and permit a plurality of sets of said jacks and shafts and rollers to support a trough line in a level position in a transverse direction and in aligned relationship in a longitudinal direction.

6. A device of the character set forth comprising vertically arranged supporting members, a conveyer located to travel between said members, channeled members secured on opposite sides of the conveyer and rigidly connected with each other, said supporting members having feed threads, feed nuts threaded on said supporting members, collars journaled on said feed nuts and disposed horizontally, stub shafts pivotally and detachably connected to said collars, means rigidly connecting said stub shafts in oppositely disposed pairs, and rollers journaled on the stub shafts and engaging in the channel members whereby the conveyer is free to slide relative to the supporting members and may be leveled and tilted relative to a horizontal plane by adjusting the feed nuts on said members.

LUTHER E. JARRETT.